US010005697B1

(12) United States Patent
Vander Hoff et al.

(10) Patent No.: US 10,005,697 B1
(45) Date of Patent: Jun. 26, 2018

(54) METHOD AND SYSTEMS FOR ISOLATION AND/OR SEPARATION OF TARGET PRODUCTS FROM ANIMAL PRODUCED WASTE STREAMS

(71) Applicant: SMARTFLOW TECHNOLOGIES, INC., Apex, NC (US)

(72) Inventors: Mark Vander Hoff, Apex, NC (US); Todd Benson, Cary, NC (US); Marc Pugh, Sanford, NC (US); Jason Bell, Pleasant Dale, NE (US)

(73) Assignee: SMARTFLOW TECHNOLOGIES, INC., Apex, NC (US)

( * ) Notice: Subject to any disclaimer, the term of this patent is extended or adjusted under 35 U.S.C. 154(b) by 350 days.

(21) Appl. No.: 14/735,276

(22) Filed: Jun. 10, 2015

Related U.S. Application Data (63) Continuation-in-part of application No. 13/985,367, filed as application No. PCT/US2012/025874 on Feb. 21, 2012, now Pat. No. 9,163,265.

(60) Provisional application No. 61/445,010, filed on Feb. 21, 2011.

(51) Int. Cl.
| | | |
|---|---|---|
| *B01D 25/00* | (2006.01) | |
| *B01D 29/00* | (2006.01) | |
| *C05B 9/00* | (2006.01) | |
| *C05B 17/02* | (2006.01) | |
| *C05G 3/00* | (2006.01) | |
| *C02F 1/00* | (2006.01) | |
| (Continued) | | |

(52) U.S. Cl.
CPC .............. *C05B 9/00* (2013.01); *B01D 61/142* (2013.01); *C02F 1/001* (2013.01); *C05B 17/02* (2013.01); *C05G 3/0064* (2013.01); *B01D 2315/10* (2013.01); *C02F 2103/20* (2013.01)

(58) Field of Classification Search
CPC ...... C05F 3/00; C05F 3/06; C05F 7/00; C05F 17/0018; C05F 17/009; C05B 9/00; C05B 17/02; C02F 2103/20; C02F 11/121; C02F 11/122; C02F 11/125; C02F 11/04; C02F 1/001; C02F 11/12; B01D 25/215; B01D 63/082; B01D 61/142; C05G 3/0064
USPC ......................................... 210/231, 631, 609
See application file for complete search history.

(56) References Cited

U.S. PATENT DOCUMENTS

| | | |
|---|---|---|
| 4,867,876 A | 9/1989 | Kopf |
| 4,882,050 A | 11/1989 | Kopf |
| 4,956,085 A | 9/1990 | Kopf |

(Continued)

FOREIGN PATENT DOCUMENTS

| | | |
|---|---|---|
| WO | WO 2011088373 | 7/2011 |
| WO | WO 2012115932 | 8/2012 |

OTHER PUBLICATIONS

Green et al, the article "Treatment Technologies for Phosphorus Removal from Water Derived from Cattle Feedyards" (Year: 2003).*

(Continued)

*Primary Examiner* — Claire A Norris
(74) *Attorney, Agent, or Firm* — Tristan A. Fuierer; Marianne Fuierer; Moore & Van Allen, PLLC (57) ABSTRACT

The present invention relates to separation methods and systems for converting high concentrations of animal wastes into useful products, wherein the separation of the desired useful products is conducted with a cross-flow filtration system having the ability to the separate desired useful (Continued)

energy and/or products from both viscous and non-viscous medium.

11 Claims, 8 Drawing Sheets

(51) Int. Cl.
*B01D 61/14* (2006.01)
*C02F 103/20* (2006.01)

(56) References Cited

U.S. PATENT DOCUMENTS

| | | | |
|---|---|---|---|
| 5,034,124 A | 7/1991 | Kopf | |
| 5,049,268 A | 9/1991 | Kopf | |
| D322,117 S | 12/1991 | Kopf | |
| D323,202 S | 1/1992 | Kopf | |
| D324,720 S | 3/1992 | Kopf | |
| D325,070 S | 3/1992 | Kopf | |
| D327,313 S | 6/1992 | Kopf | |
| D328,789 S | 8/1992 | Kopf | |
| 5,232,589 A | 8/1993 | Kopf | |
| 5,342,517 A | 8/1994 | Kopf | |
| 5,360,555 A | 11/1994 | Batten | |
| D357,059 S | 4/1995 | Kopf | |
| 5,543,050 A | 8/1996 | Roshanravan | |
| 5,593,580 A | 1/1997 | Kopf | |
| 5,730,029 A | 3/1998 | Stoldt et al. | |
| 5,868,930 A * | 2/1999 | Kopf | B01D 63/084 210/231 |
| 6,022,742 A | 2/2000 | Kopf | |
| 6,048,727 A | 4/2000 | Kopf | |
| 6,139,746 A | 10/2000 | Kopf | |
| 6,214,221 B1 | 4/2001 | Kopf | |
| 6,214,574 B1 | 4/2001 | Kopf | |
| 6,383,380 B1 | 5/2002 | Kopf | |
| 6,464,875 B1 | 10/2002 | Woodruff | |
| 6,569,340 B2 | 5/2003 | Kopf et al. | |
| 6,596,172 B1 | 7/2003 | Kopf | |
| 6,827,960 B2 | 12/2004 | Kopf et al. | |
| 6,852,352 B2 | 2/2005 | Kopf et al. | |
| 6,875,459 B2 | 4/2005 | Kopf et al. | |
| 6,946,075 B2 | 9/2005 | Kopf | |
| 7,384,562 B2 | 6/2008 | Rogers | |
| 7,544,296 B2 | 6/2009 | Kopf et al. | |
| 7,632,319 B2 | 12/2009 | Rogers | |
| 7,767,839 B2 | 8/2010 | Berry et al. | |
| 7,806,957 B1 * | 10/2010 | Burke | C05F 17/0018 71/10 |
| 8,366,794 B2 | 2/2013 | Tremblay et al. | |
| 2003/0232109 A1 | 12/2003 | Dawley et al. | |
| 2006/0004237 A1 | 1/2006 | Appel et al. | |
| 2006/0283221 A1 * | 12/2006 | Camisa | C02F 11/121 71/21 |
| 2010/0055753 A1 | 3/2010 | Geros | |
| 2011/0309018 A1 | 12/2011 | Kopf et al. | |
| 2012/0205311 A9 | 8/2012 | Kopf et al. | |
| 2013/0015119 A1 | 1/2013 | Pugh et al. | |
| 2013/0115588 A1 | 5/2013 | Davis et al. | |
| 2013/0212932 A1 | 8/2013 | Bell et al. | |
| 2013/0236938 A1 | 9/2013 | Vander Hoff et al. | |

OTHER PUBLICATIONS

"Biodiesel Handling and Use Guide." National Renewable Energy Laboratory, 4th Edition, 2009.
Chakrabarti, Alicia R. et al. "4Waste Grease Biodiesel Production at a Wastewater Treatment Plant." WEFTEC® 08, 2008, pp. 2770-2789.
Cicek, N. "A review of membrane bioreactors and their potential application in the treatment of agricultural wastewater." Canadian Biosystem Engineering, 2003, vol. 45. pp. 637-649.
Drapcho, Caye M. et al. "Biofuels Engineering Process Technology." 2008 The McGraw-Hill Companies, Inc.
Durrett, Timothy, P. "Plant triacylglycerols as feedstocks for the productions of biofuels." The Plant Journal (2008) vol. 54, pp. 593-607.
Fjerbaek, Lene et al. "A Review of the Current State of Biodiesel Production Using Enzymatic Transesterification." Biotechnology and Bioengineering, vol. 102, No. 5, Apr. 1, 2009.
Galitsky, Christina et al. "Energy Efficiency Improvement and Cost Saving Opportunities for the Corn Wet Milling Industry." Ernest Orlando Lawrence Berkeley National Laboratory, Jul. 2003.
Green, C. et al. "Water Conservation Policy Alternatives for the Ogallala Aquifer in Texas." College of Agricultural Sciences and Natural Resources Report T-1-589, Aug. 2005.
Kawakami, Koei et al. "Application of a *Burkholderia cepacia* lipase-immpbilized silica monolith to batch and continuous biodiesel production with a stoichiometric mixture of methanol and Jatropha oil." Biotechnology for Biofuels, 2011, 4:42.
Luković, Nevena et al. "Biodiesel Fuel Production by Enzymatic Transesterification of Oils: Recent Trends, Challenges and Future Perspectives." Alternative Fuel, 2011, pp. 47-72.
Maurer, M. et al. "Nitrogen recovery and reuse." Water recycling and resource recovery in industry: analysis, technologies and implentation, London 2002.
Mittelbach, Martin. "Biodiesel: Production Technologies and Perspectives." Institute for Chemistry (IFC) Working Group Renewable Resources, Karl-Franzens-University Graz, A-0810 Graz, Austria, Sep. 19, 2005.
Paynich, Mallory. "Transesterification of Vegetable Oils to Produce Biodiesel Fuel." MMG445 eJournal, 2005.
Sheedlo, Michael. "A review of the processes of biodiesel production." MMG 445 Basic Biotechnology eJournal, 2008, 4:61-65.
Stockinger, Herman. "Converting Waste to BioDiesel." World Biofules Markets 2011, Rotterdam, Mar. 24, 2011.
Tyson, K. Shaine. "Brown Grease Feedstocks for Biodiesel." National Renewable Energy Laboratory, Jun. 19, 2002.
Wiman, M. et al. "Rheologial Characterization of Dilute Acid Pretreated Softwood." Biotechnology and Bioengineering, EPub Dec. 2010, vol. 108, pp. 1031-1041.

* cited by examiner

METHOD AND SYSTEMS FOR ISOLATION AND/OR SEPARATION OF TARGET PRODUCTS FROM ANIMAL PRODUCED WASTE STREAMS

CROSS-REFERENCE TO RELATED APPLICATIONS

This application is a Continuation-in-Part application claiming priority to co-pending U.S. patent application Ser. No. 13/985,367, which in turn is an application filed under the provisions of 35 U.S.C. § 371 and claiming priority to International Patent Application No. PCT/US2012/025874 filed on Feb. 21, 2012, which in turn claimed priority to U.S. Provisional Patent Application Ser. No. 61/445,010 filed on Feb. 21, 2011, the contents of which are incorporated by reference herein for all purposes.

BACKGROUND OF THE INVENTION

Field of Invention

The present invention relates to generally to the problems associated with waste in animal confinements, and more specifically, to separation methods and systems for converting high concentrations of animal wastes into useful products, wherein the separation of the desired useful products is conducted with a cross-flow filtration system having the ability to the separate desired products from both viscous and non-viscous medium.

Related Art in Technical Field

The cleanup and handling of dairy cattle, beef cattle, swine and poultry manure has become a critical issue in the management and disposal of animal waste. Animals have been raised for centuries for food and previously such animals grazed in fields or pens. Current methods of raising livestock include housing in high concentration within a confined space. Numerous drawbacks of such confinement include emotional stress on the animals but also high concentrations of waste that must be removed from the confined space.

The manure produced must be removed regularly to ensure adequate sanitation and to prevent disease. One manure removal method is to flood the housing area with water in order to wash away the manure. The resulting effluent, that being a liquid/solid manure slurry, is typically directed through pipes or channels to a manmade slurry pond or lagoon, where the solids and particulates settle to the bottom and the animal waste decomposes. After some decomposing, the waste can be applied as a fertilizer. Additionally the liquid/solid manure can be directed to a biodigester to capture some of the gaseous components of the manure and use the gases for energy, thereby reducing air quality issues of manure accumulation and storage. However, the remaining liquids and solid from biodigestor processing must still be addressed to minimize loss or nutrient contamination of lagoons, fields, drinking water, wells, or fresh water streams or lakes.

Notably, prolonged mixing of solid and liquid wastes in a waste manure lagoon can result in the transfer of a significant amount of nutrients from the solid material to the surrounding liquid, so that the solids become depleted of nutrients that may be desirable in a manure fertilizer. However, the liquids become loaded with nitrogen, phosphorous and salts to such an extent that they must be either limited in their irrigation use, or mixed with fresh water to lower the proportion of these substances. In other words, the useful qualities of both the solid and liquid portions of the slurry mixture are degraded over time in a slurry pond or lagoon.

Further, the environmental impact can be substantial when applying the waste to fields. Such environmental issues may include ground leaching from the lagoon causing contamination of ground water and/or streams and sand soil contamination. Additionally, the high volume of solid waste manure, coupled with it use as fertilizer in local fields, results in increased levels of phosphorus, potassium and heavy metals in the soils. This may allow such minerals to also leach into drainage waters and run-off streams. The high volume of liquid waste manure, coupled with it use as fertilizer in local fields, results in increased levels of nitrogen rich ammonium and ammonia in the soils. This may allow such minerals to also leach into drainage waters and run-off streams.

There has been increasing publicity and stricter environment requirements and enforcement because of the continuing concern over maintaining water quality in watershed areas due to the release of manure as normal operational discharges from dairy cattle, beef cattle, swine, poultry and other confined animal feeding operations. Current technologies for separating solids and nutrient components of such animal waste have limitations, are costly to operate, and result in the use of large quantities of fuel and labor in order to provide solid and water-based effluents that can either be recycled or are environmentally acceptable to spread on farmlands.

Thus, what is needed is an improved process and separation system for treating animal waste that is low in capital equipment cost, low in waste transportation cost, simple to operate, and that provides solid and liquid effluents containing beneficial and useful products.

SUMMARY OF THE INVENTION

The present invention relates to separation systems and methods to process a manure source containing urine and fecal matter from dairy cattle, beef cattle, swine, sheep, goats, poultry, horses, rabbits and other confined animals to provide at least a liquid fertilizer and a concentrated viscous fertilizer that can be dried to a solid form. Other target products may be separated from either the liquid or concentrated viscous fertilizer including, but not limited to, nitrogen, potassium, potable water, filtrate with reduction of residuals for spraying on fields, and/or phosphorus.

In one aspect, the present invention provides a process for treating manure in order to produce a liquid fertilizer and a concentrated viscous fertilizer, the process comprising:
  providing a manure medium;
  separating the manure into the liquid fertilizer and the concentrated viscous fertilizer by passing through a cross-flow filtration cassette comprising:
  an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet; and wherein the liquid fertilizer is in the permeate stream and the concentrated viscous fertilizer remains in the retentate stream.

Livestock manure besides containing a mixture of feces and urine may also include wasted feed, bedding and water (including: spilled water, flush water, wash water, and precipitation). Manure characteristics are generally affected by diet, species and the growth stage of the animals, and the manure collection method used, including the amount of water added to dilute the waste. Typically, animal waste manure is about 80% to about 95% liquid by weight due to urine, sloppy drinking, animal washing and flush water. As such, the manure medium may be pretreated with mechanical system to remove any unwanted material, larger solids and excess liquids from the manure medium before introduction into the cross-flow filtration cassette, wherein the pretreating includes systems such as screw press, centrifuge, vibrating screen, mesh screening, belt filter, hydrocylcone and other systems that may further reduce particle size, and/or remove unwanted large material to ensure easy flow through the cross-flow filtration cassette of the present invention.

Further, the manure may be pretreated in an anaerobic digester, which includes holding manure in an air-tight tank that is heated to about 100 degrees—just like a cow's stomach. Bacteria in the manure thrive in these conditions and they consume solids in the manure while releasing methane gas. Naturally occurring bacteria will degrade the volatile solids (VS), releasing a combination of carbon dioxide ($CO_2$) and methane ($CH_4$) that may be burned/combusted for energy production. Digestion does not reduce the nutrients in the manure, although it may alter the form of the nitrogen (more ammonia) and phosphorus (more orthophosphate).

Optionally the liquid fertilizer which contains at least phosphorus and nitrogenous compounds can be further treated to remove additional "valuable" nutrients such as soluble phosphorus (SP). The addition of magnesium chloride ($MgCl_2$) may be used to force the precipitation of struvite ($MgNH_4PO_4.6H_2O$). Notably, adjusting the pH of the treated liquid concentrate to a pH of about 9.0-10 with sodium hydroxide (NaOH) can increase SP reduction and formation of struvite.

Further, ferric chloride ($FeCl_3$), ferric sulfate ($FeSO_4$), calcium hydroxide (lime), aluminum sulfate (alum) and aluminum chloride $AlCl_3$) can be used for phosphorus binding and the formation of common phosphorus salts. The addition of these binding agents forms a solid salt that can be collected and removed by cross-flow filtration cassettes of the present invention.

Still further, the manure medium may be treated with chemicals to help separate solids from liquids. Flocculation is a process that converts coagulated particles into large, rapidly settling masses, also called flocs. The most common chemicals used to coagulate and flocculate solids in animal manure and wastewater are organic polymers such as polyacrylamide (PAM), and metal salts such as ferric chloride ($FeCl_3$), alum ($Al_2(SO_4)_3$) and lime ($Ca(OH)_2$). Such flocs can be further removed by screening methods or centrifuging.

In another aspect, the present invention provides for a separation method of at least one target product from a manure medium in a viscous or non-viscous liquid form, the method comprising the steps of:

providing a manure medium in a vessel wherein the manure medium comprises the at least one target molecule, wherein the at least one target product is selected from the group consisting of nitrogen, potable water, filtrate with reduction of residuals, and phosphorus;

providing at least one cross-flow filtration cassette comprising:

an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the liquid medium to be filtered flows across the filter sheets, solids or high-molecular-weight species of diameter larger than the filter sheet's pore size, are retained in the retentate flow, and at least a portion of the liquid medium with any permeate species diffuse through the filter sheets and enter the permeate sheet and permeate flow; wherein each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet;

effectuating a sufficient flow of the manure medium comprising the target product from the vessel through at least one cross-flow filtration cassette; and sequentially capturing one or more filtration fractions generated by the cross-flow filtration modules, wherein the target product is physically separated by said one or more cross-flow filtration and wherein said physical separation of target product is based on their different molecular weights, size and/or operating conditions.

In a still further aspect, the present invention provides for a process for treating manure in order to produce fertilizer products and potable or non-potable water, the process comprising:

providing a manure slurry;

passing the manure slurry through a first cross-flow filtration cassette comprising:

an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet; and wherein a viscous stream phase remains in the retentate stream and a liquid stream phase is the permeate stream;

passing the permeate stream through a second cross-flow filtration cassette of the present invention wherein a liquid fertilizer concentrate is retained in the retentate stream and a permeate filtrate constitutes recyclable water.

Alternately, the permeate stream can be passed through a conventional nanofiltration or reverse osmosis spiral to create recyclable or reusable water.

The liquid stream phase may be utilized as the liquid fertilizer and the viscous stream phase may be dehydrated to minimize water content and provides for a solid fertilizer. Preferably, the viscous stream is dried to a consistency of less than 15% moisture and more preferably to about 10% or less moisture to avoid bioactivity and degradation. In a preferred embodiment the retentate comprising the viscous material is cast or extruded in a thin film onto a conveyor belt which is then introduced into a chamber that comprises a system to provide a thin uniform layer of the viscous material. Such systems may include a roller, extrusion die, knife box or doctor blade to produce a thin consistent film layer of the viscous material. Such thin consistent layers provide for efficient and faster drying, reduction of energy costs and consistency in the end product, which is flake or powder that is easily removed from the conveyor belt system and also suitable for use as a dry fertilizer. Optionally a heating system is included to increase the speed of the drying process.

In yet another aspect, the present invention provides for production of potable and non-potable water, the method comprising:

moving a manure slurry through a first cross-flow filtration unit according to the present invention wherein such manure slurry is separated and waste water containing residues is separated into a permeate stream and the remaining viscous retentate stream is collected for further use;

moving the permeate stream through a second cross-flow filtration unit according to the present invention wherein the waste water is separated providing permeate stream depleted of the residues and a residue containing retentate; and moving the permeate stream depleted of the residues through a third cross-flow filtration unit according to the present invention, wherein the permeate stream is purified and provides for potable water and/or non-potable that is acceptable for animal drinking water.

Other aspects and advantages of the invention will be more fully apparent from the ensuing disclosure and appended claims.

DETAILED DESCRIPTION OF THE INVENTION

While not to be construed as limiting, the terms used herein have the following definitions unless indicated otherwise.

The term "manure" refers to any material that includes animal waste and may include but is not limited to water, feed, urine, fecal matter, straw, hay, bedding material, peat moss, and composts.

The term "cross-flow filtration cassette" refers to a type of filter module or filter cassette that comprises a porous filter element across a surface of which the liquid medium to be filtered is flowed in a tangential flow fashion, for permeation through the filter element of selected component(s) of the liquid medium. In a cross-flow filter, the shear force exerted on the filter element (separation membrane surface) by the flow of the liquid medium serves to oppose accumulation of solids on the surface of the filter element. Cross-flow filters include microfiltration, ultrafiltration, and nanofiltration systems. In a preferred embodiment, the cross-flow filter comprises a multiplicity of filter sheets (filtration membranes) in an operative stacked arrangement, e.g., wherein filter sheets alternate with permeate and retentate sheets, and as a liquid to be filtered flows across the filter sheets, impermeate species, e.g. solids or high-molecular-weight species of diameter larger than the filter sheet's pore size, are retained and enter the retentate flow, and the liquid along with any permeate species diffuse through the filter sheet and enter the permeate flow. In the practice of the present invention, cross-flow filtration is a preferred separation method. Cross-flow filter modules and cross-flow filter cassettes useful for such filtration are commercially available from Smartflow Technologies, Inc. (Apex, N.C.). Suitable cross-flow filter modules and cassettes of such types are variously described in the following United States patents: U.S. Pat. No. 4,867,876; U.S. Pat. No. 4,882,050; U.S. Pat. No. 5,034,124; U.S.

Pat. No. 5,034,124; U.S. Pat. No. 5,049,268; U.S. Pat. No. 5,232,589; U.S. Pat. No. 5,342,517; U.S. Pat. No. 5,593,580; and U.S. Pat. No. 5,868,930; the disclosures of all of which are hereby incorporated herein by reference in their respective entireties.

Figure 1:
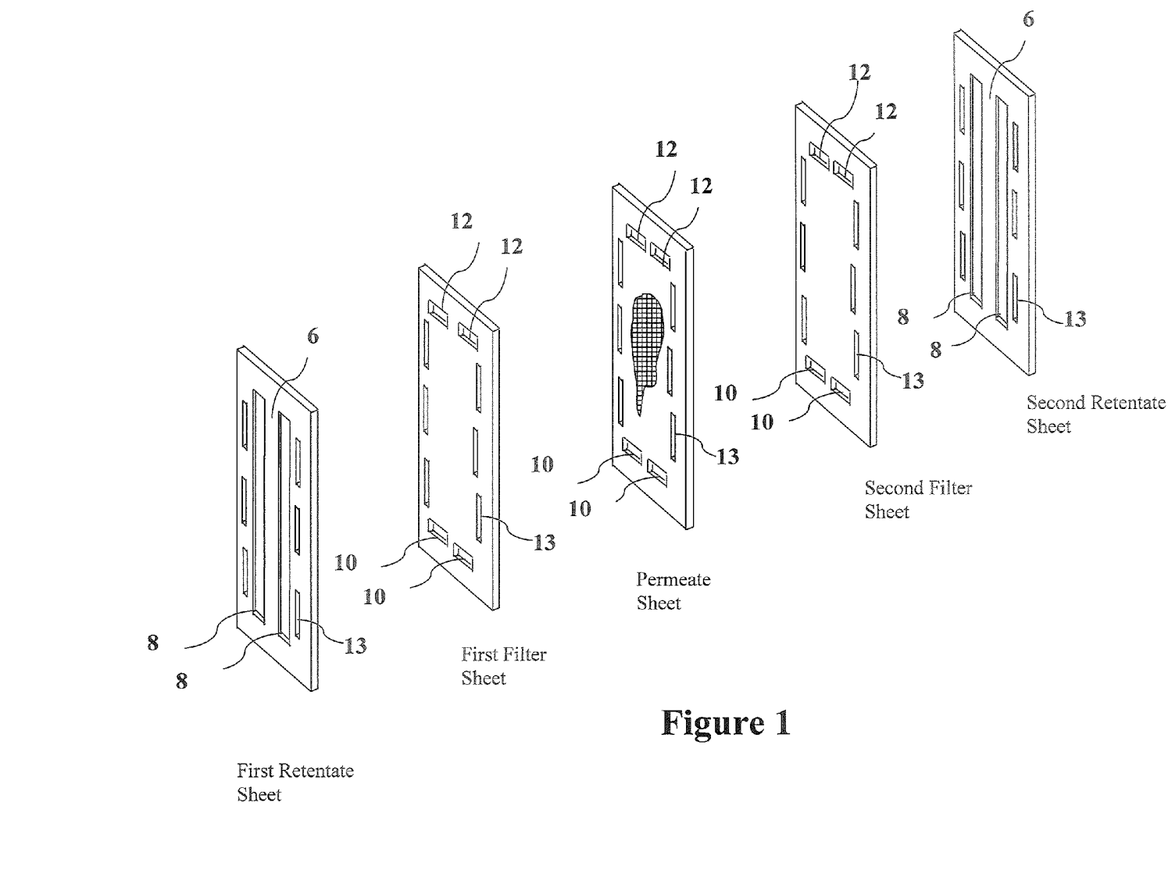
FIG. 1 shows the components of a cross-flow filtration cassette used in the separation of renewable fuels

In one particular aspect, the present invention relates to a cross-flow filtration cassette, as shown in FIG. 1, comprising a multilaminate array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the permeate and filter sheet members in said array has at least one inlet basin opening 10 at one end thereof, and at least one outlet basin opening 12 at an opposite end thereof, with permeate passage openings 13 at longitudinal side margin portions of the sheet members; each of the first and second retentate sheets having at least one channel opening 8 therein, extending longitudinally between the inlet 10 and outlet basin 12 openings of the permeate and filter sheets in the array, and being compression bonded to an adjacent filter sheet about peripheral end and side portions thereof, with their basin openings and permeate passage openings in register with one another and the permeate passage openings of each of the retentate sheets being circumscribingly compression bonded to the adjacent filter sheet, and with a central portion of each of the retentate sheets and adjacent filter sheets being unbonded to permit permeate contacting the retentate sheet to flow through the filter sheet to the permeate sheet; and each of the filter sheets being secured at its peripheral portions on a face thereof opposite the retentate sheet, to the permeate sheet.

The term "sheet" will denote the generally planar members of the cassette, the cassette thus comprising an assembly of permeate sheets, filter sheets, and retentate sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges.

The term "compressible" in reference to the retentate sheet or other structural feature or sheet member of the present invention means that such component or member is compressively deformable by application of load or pressure thereon.

The above-described filtration cassette of the invention comprises a "base sequence" of elements, defined as a sequence of sheet elements constituting a compressible retentate sheet (hereafter designated by the symbol "CR"), a filter sheet (hereafter designated by the symbol "F"), a foraminous permeate sheet (hereafter designated by the symbol "P"), a second filter sheet ("F"), and a second compressible retentate sheet ("CR"), thereby providing a sequence of sheet elements, CR/F/P/F/CR.

The base sequence of sheet elements may be utilized in construction of filters comprising a plurality of filtration cassettes, wherein the compressible retentate sheet is utilized to seal the top and bottom elements of a plurality of filtration cassettes of a sequence, comprising compressible retentate sheet "CR", filter sheet "F", foraminous permeate sheet P, filter sheet "F", non-compressible retentate sheet "R", filter sheet "F", foraminous permeate sheet P, filter sheet "F", and compressible retentate sheet "CR". An illustrative stacked cassette filter according to the invention may for example feature the sheet sequence CR/F/P/F/R/F/P/F/R/F/P/F/CR, comprising a first compressible retentate sheet, two base sequences of sheets FPFRFPF in a repetitive sequence, and a second compressible retentate sheet. In all repetitive sequences, other than a single cassette base sequence, the following relationship is observed: where X is the number of filter sheets F, the quantity 0.5 X−1 is the number of non-compressible retentate sheets R, and the quantity 0.5 X is the number of foraminous permeate sheets P, with two compressible retentate sheets being utilized to seal the top and bottom extremities of the intervening sequence.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation, to utilize a single cassette comprising the base sequence CR/F/P/F/CR wherein the outermost retentate sheets in the sequence are compression-sealed at their outer faces to an end plate accommodating removal of permeate from the permeate passage openings of the constituent sheet members in the cassette.

The sheets of filter material used in the cassette article of the present invention may be of any suitable porosity rating. As used herein, the porosity rating of a sheet of filter material is the smallest particle size which cannot pass through the pores of the filter material. Typical porosity ratings are expressed in molecular weight (MW) and micrometer units, e.g., a 2 micron filter media sheet being a material which will pass particles smaller than 2 microns in diameter through the pores of the material, while particles larger than 2 microns will not be passed through the filter material, and as a further example, a 10,000 MW filter media sheet being a material which will pass particles smaller than 10,000 MW in diameter through the pores of the material, while particles larger than 10,000 MW will not be passed through the filter material.

Filters can be divided into categories based on the nominal molecular weight limits (NMWL) is an indication that most dissolved macromolecules with molecular weights higher than the NMWL and some with molecular weights lower than the NMWL will be retained by the membrane. A component's shape, its ability to deform, and its interaction with other components in the solution all affect its retention. Depending on the molecules to be retained, membrane NMWLs in the range of 1 kD to 500 kD may be used in the present invention. For use in the present invention, the membranes are preferably in the range of 5 kD to 300 kD and more preferably in the range of 10 kD to 100 kD.

In one preferred embodiment of the cassette article of the present invention, a retentate sheet is provided with a plurality of transversely spaced-apart, longitudinally extending ribs or partitions, extending upwardly from (the central portion of) each of the main top and bottom faces of the retentate sheet, such ribs or partitions being of substantially the same height and substantially parallel to one another to define a series of channels between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium, e.g., applied in a "bead" in the longitudinal direction of the retentate sheet on both main top and bottom faces thereof.

The term "bonded" in reference to adjacent sheets in the multilaminate cassette means that the adjacent sheets are secured to one another in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out by compressive bonding or with a suitable adhesive or sealant medium, e.g., a urethane, epoxy, cyanoacrylate, or silicone adhesive material, which fills the interstices of the foraminous sheet in the bonded pair of sheets, and adhesively joins one of the adjacent sheets to the other in the bonded areas.

The term "compressive bonding" and "compressively bonded" refer to bonding and bonding operations in which the structure being bonded is subjected to a compressive load or force, for sufficient time and under sufficient period to effect the bonding securement of the structure. Compressive bonding of laminae in the practice of the invention is highly desirable, in order to assure the leak-tightness and structural integrity of the resulting multilaminate assembly of the cassette.

The invention may for example be carried out with bonding of sheets in the multilaminate array to one another with cyanoacrylate or other "fast" adhesives, or alternatively the adhesive or sealant medium may require extended cure at ambient temperature or other appropriate cure conditions, and it may be advantageous to conduct such cure with the laminate structure in a fixture or other assembly in which the compressive bonding is effectively completed.

In a specific aspect of the invention, each of the foraminous permeate sheets may constitute a foraminous material of from about 80 to about 300 mesh size. Each of the foraminous permeate sheets may for example comprise a woven polymeric mesh, e.g., of a material selected from the group consisting of polyester, polypropylene, nylon, fluorocarbon polymers such as polytetrafluoroethylene, polyethylene, and polysulfone, and composites comprising one or more of such materials.

The filter sheets used in the filtration cassette of the present invention may be of any suitable materials, such as a material selected from the group consisting of cellulose, polyphenylene oxide, polysulfone, cellulose nitrate, cellulose acetate, regenerated cellulose, polyether amide, polyphenylene oxide/polysulfone blends, mixed esters of cellulose, and polyether sulfone.

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution passing by.

In the use of cross-flow filtration modules of the type described in the aforementioned patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein that numerous heretofore expensive or difficult separations are rendered far simpler and more economical by employing the techniques described herein.

Thus, the invention relates in another aspect to optimizing the membrane separation process, comprising:
selecting a cross-flow membrane module wherein the distance from the inlet port to the outlet port is equidistant from the inlet to outlet for each sub-channel of the device, i.e., each sub-channel is of a same dimensional character;
selecting an optimal channel height;
selecting an optimal shear rate and/or channel velocity;
selecting an optimal transmembrane pressure;
selecting an optimal membrane pore size;
selecting an optimal temperature;
selecting an optimal channel length; and
selecting an optimal pressure drop which is the composite of
the optimal channel height;
the optimal shear rate and/or channel velocity;
optimal channel length; and
the viscosity of the solution being filtered.

Selecting a channel height can be performed mathematically or empirically by trial and error. In most animal manure applications, trial and error has been more appropriate due to the fact that the viscosity of the prefitered manure, manure digestate, or product solution is rarely known, the nutrient levels and contiuent components are highly variable based on season, diet, and living conditions. The objective of channel selection is to minimize channel height with three critical stipulations: first, the channel must be sufficiently high to allow the unrestricted passage of any larger material such as manure solids; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

Another aspect of the present invention relates to a stacked cassette cross-flow filter comprising cassette articles of the type described above.

Figure 2:
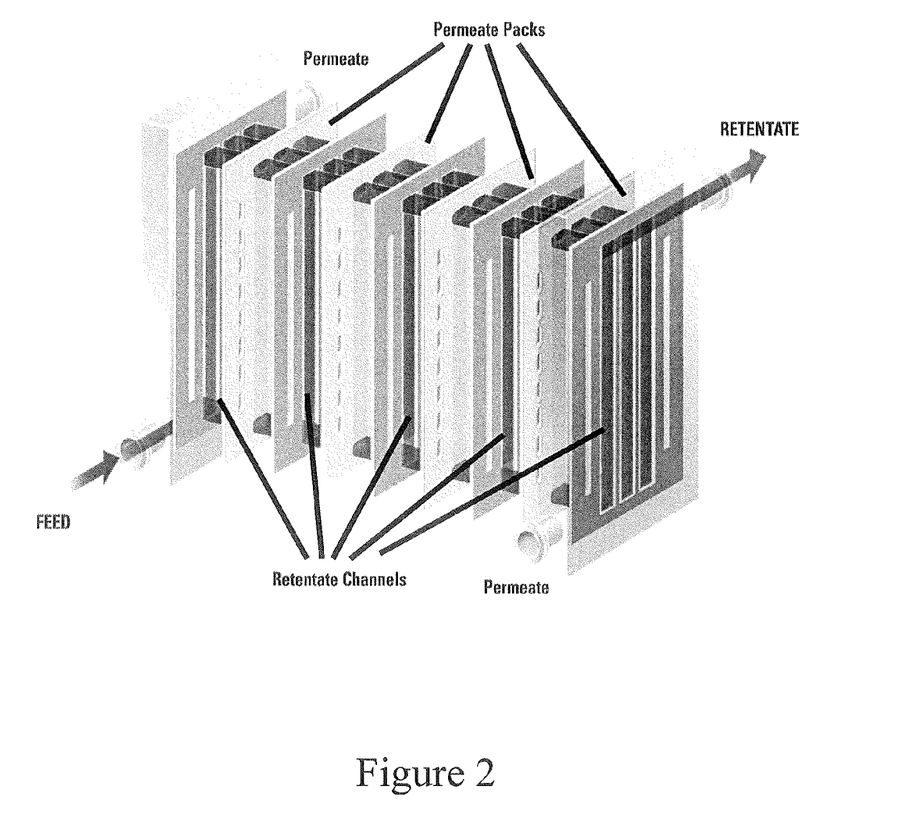
FIG. 2 shows the flow pattern of the retentate through a multiplicity of sheets adapted to end plates with retentate inlet and outlet and permeate inlet and outlet.

Still another aspect of the present invention relates to a pair of end plates or manifold assembly in which the cassettes are secured for operation as shown in FIG. 2.

Figure 3:
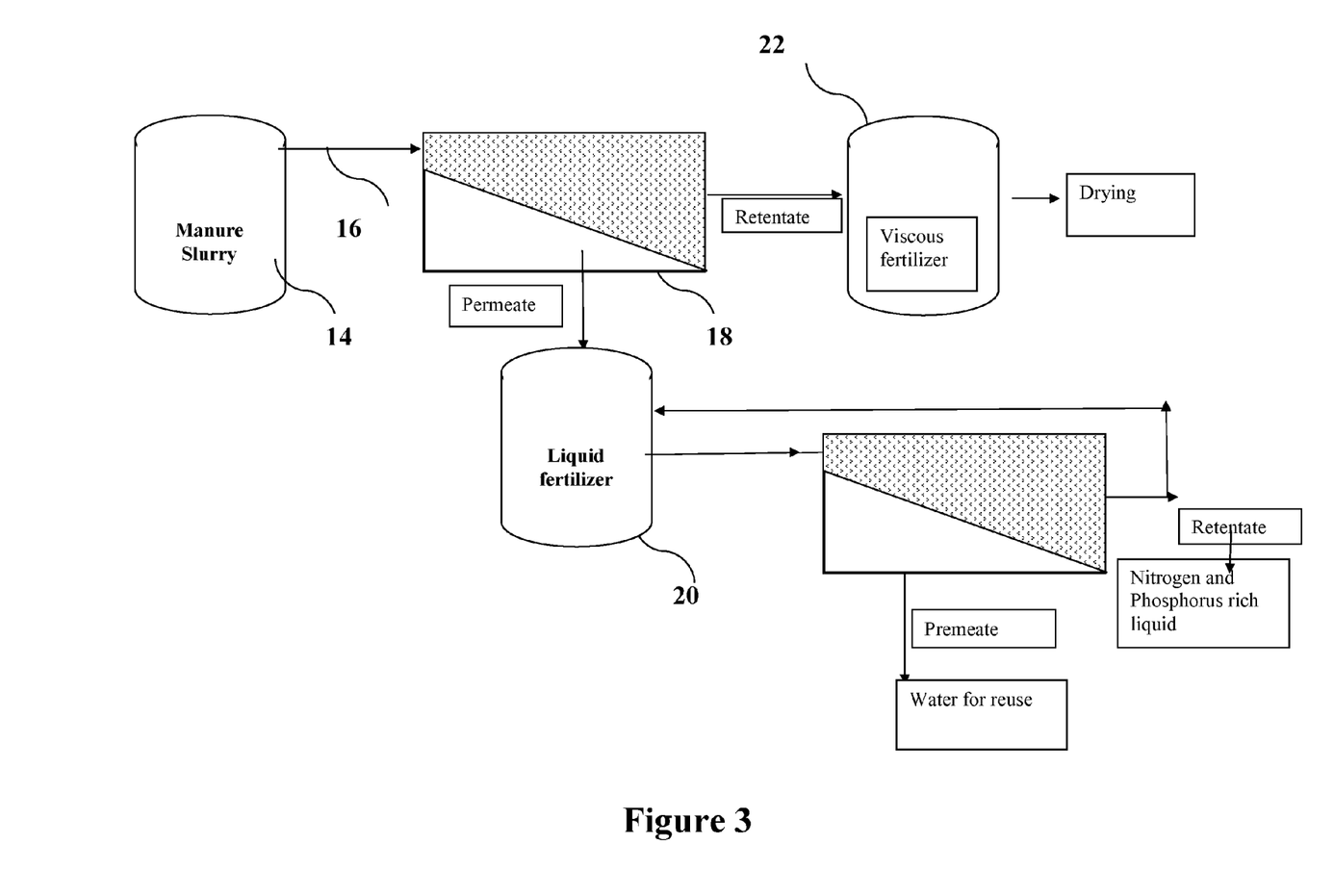
FIG. 3 shows a system for separating manure slurry.

Referring to FIG. 3, a vessel 14 is shown in which manure slurry is included into a cross-flow filtration cassette 18 to be separated into a liquid fertilizer in the permeate stream and a viscous concentrated fertilizer in the retentate stream. The components of the cross-flow filtration cassette 18 are described in FIG. 1 and the separation is facilitated by the use of a filtration cassette comprising a multilaminate array of sheet members of generally rectangular and generally planar shape with main top and bottom surfaces, wherein the sheet members include:
a first compressible retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective inlet 10 and outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

a first sheet member of filter material having (i) multiple basin openings, of a suitable shape, e.g., polygonal, semicircular, or sector shape, at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the foraminous permeate sheet member at their respective end and side portions, with their basin openings and permeate passage openings in register with one another and the basin openings being circumscribingly bonded at respective end portions of the first sheet member of filter material and the foraminous permeate sheet member, and with a central portion of the first sheet member of filter material and the foraminous permeate sheet member being unbonded so as to define a central portion permeate channel of the foraminous permeate sheet communicating with the permeate passages in the first sheet member of filter material and in the foraminous permeate sheet member;

a forminous permeate sheet member of screen or mesh material, having (i) multiple basin openings of suitable shape at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member;

a second sheet member of filter material having (i) multiple basin openings at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the second sheet member of filter material is compression sealed to the retentate sheet member at their respective end and side portions, with their basin openings and permeate passage openings in register with one another and the permeate passage opening of the retentate sheet member being compression sealed to the second sheet member of filter material, and with a central portion of the second sheet member of filter material and the retentate sheet member being unbonded to permit permeate contacting the retentate sheet member to flow through the second sheet member of filter material; and a second compressible retentate sheet member of suitable material, e.g. polysulfone, polyethersulfone, polycarbonate, urethane, silicone, having (i) at least one longitudinally extending rib or partition element 6, provided that when multiple partition elements are employed, the partition elements are transversely spaced-apart from one another, such partition elements being of substantially the same height and substantially parallel to one another, to define a single channel 8 or a series of channels between the partitions, extending longitudinally between the respective inlet and outlet basin openings of the filter elements and permeate sheet members, on both faces thereof, (ii) permeate passage openings 13 at the side portions of the sheet member, and (iii) the retentate sheet compression sealed to the second sheet of filter material at respective end and side portions thereof, with their basin openings and permeate passage openings in register with one another and the permeate passage opening of the retentate sheet member being compression sealed to the second sheet member of filter material, and with a central portion of the first sheet member of filter material and the retentate sheet member being unbonded to permit permeate contacting the retentate sheet member to flow through the second sheet member of filter material to the foraminous permeate sheet member.

Notably, nutrients can be removed from both the permeate stream and retentate stream including ammonia, phosphorus, potassium and other trace elements that can be used as fertilizer additives or further purified and added to animal feed.

Figure 8:
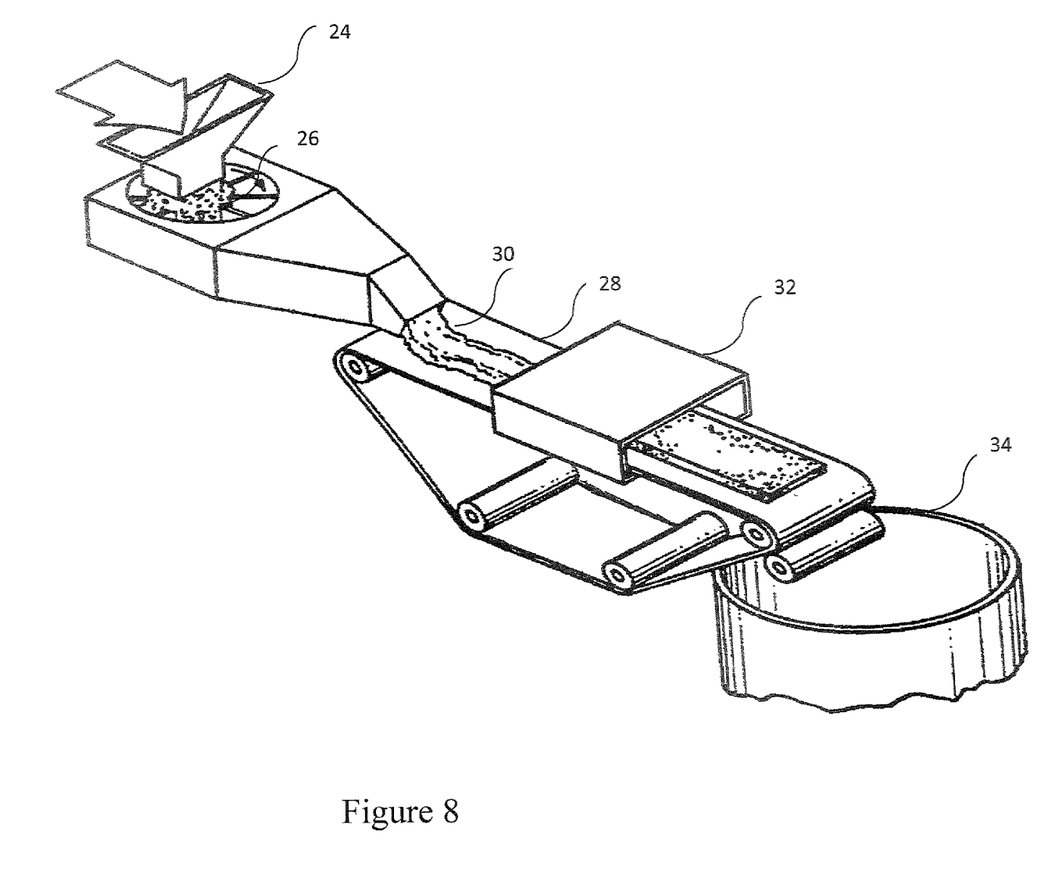
FIG. 8 shows a perspective view of an extruder and drying system.

As shown in FIG. 3, the manure slurry or digestate is contained in vessel 14 and moved into the cross-flow filtration unit of the present invention 18, wherein the permeate steam is separated and introduced into the liquid fertilizer vessel 20 and can be used for liquid fertilizer. Optionally the liquid fertilizer can be further treated by passing through a second cross-flow filtration unit of the present invention for concentration of desired target products such as nitrogen and/or phosphorus and producing usable water in the permeate. Optionally the retentate can be redirected back to the liquid fertilizer tank. Furthermore the viscous retentate fertilizer may be optionally processed through drying setup as shown in FIG. 8 to produce a flake or powder solid fertilizer.

Figure 4:
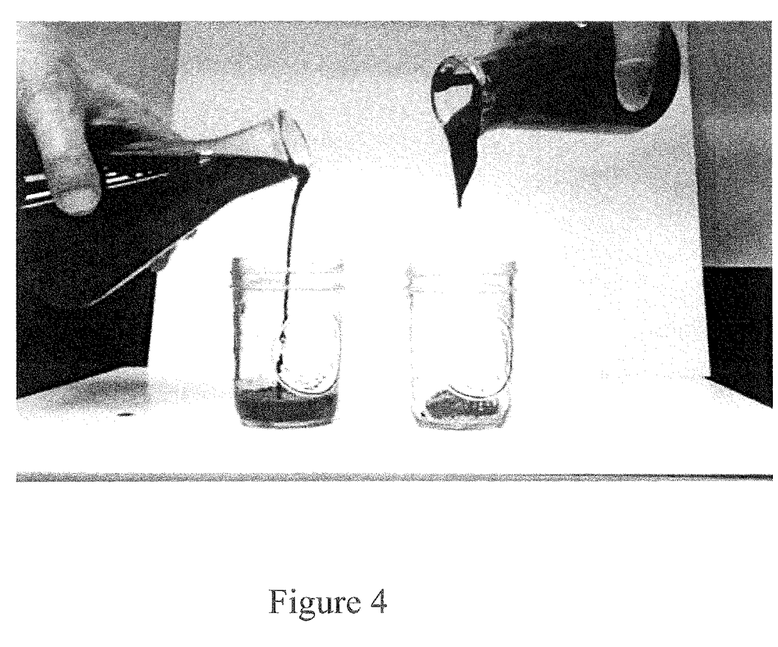
FIG. 4 illustrates the consistency of the source manure introduced into the vessel 14 (left side of the photo) and the increased viscosity of the concentrate (right side of the photo) after processing in the system of FIG. 3.

FIG. 4 illustrates the consistency of the manure slurry or digestate introduced into the vessel 14 of FIG. 3 (left side of the photo) and the increased viscosity of the concentrate retained in the viscous retentate stream (right side of the photo) that can be further processed by drying to provide a solid fertilizer. Generally, the manure digestate comprises from about 3 to 8% solids and with the use of the presently disclosed cross-flow filtration cassette there is available about an 80 to 90% volume reduction (5 to 10× concentration). As such, the viscous retentate, after treatment, can include from about 15% solids (5×) to about 80% (10×) solid in the paste.

Figure 5:
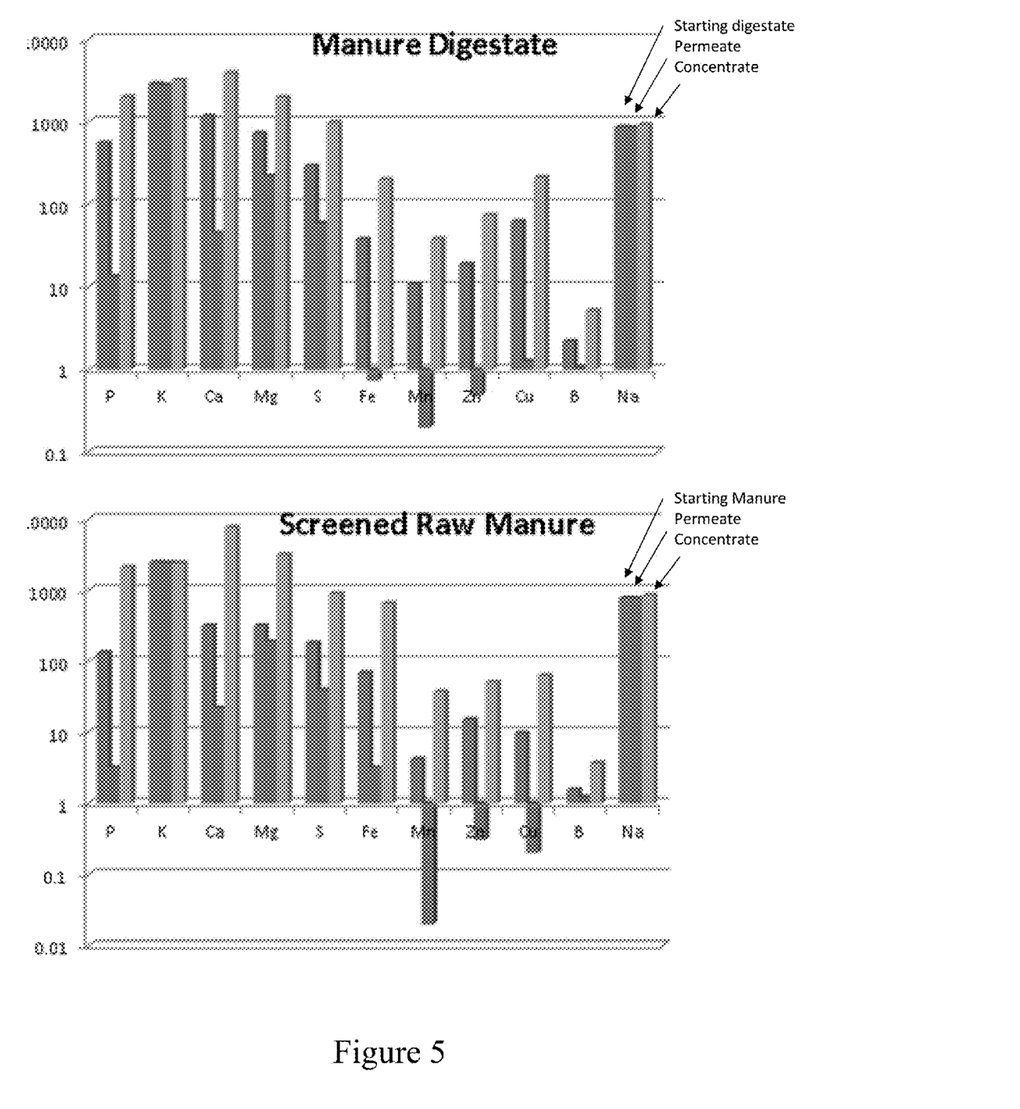
FIG. 5 shows the difference in amounts of specific elements of both a manure digestate and screen raw manure after processing in the system of FIG. 3.
Figure 6:
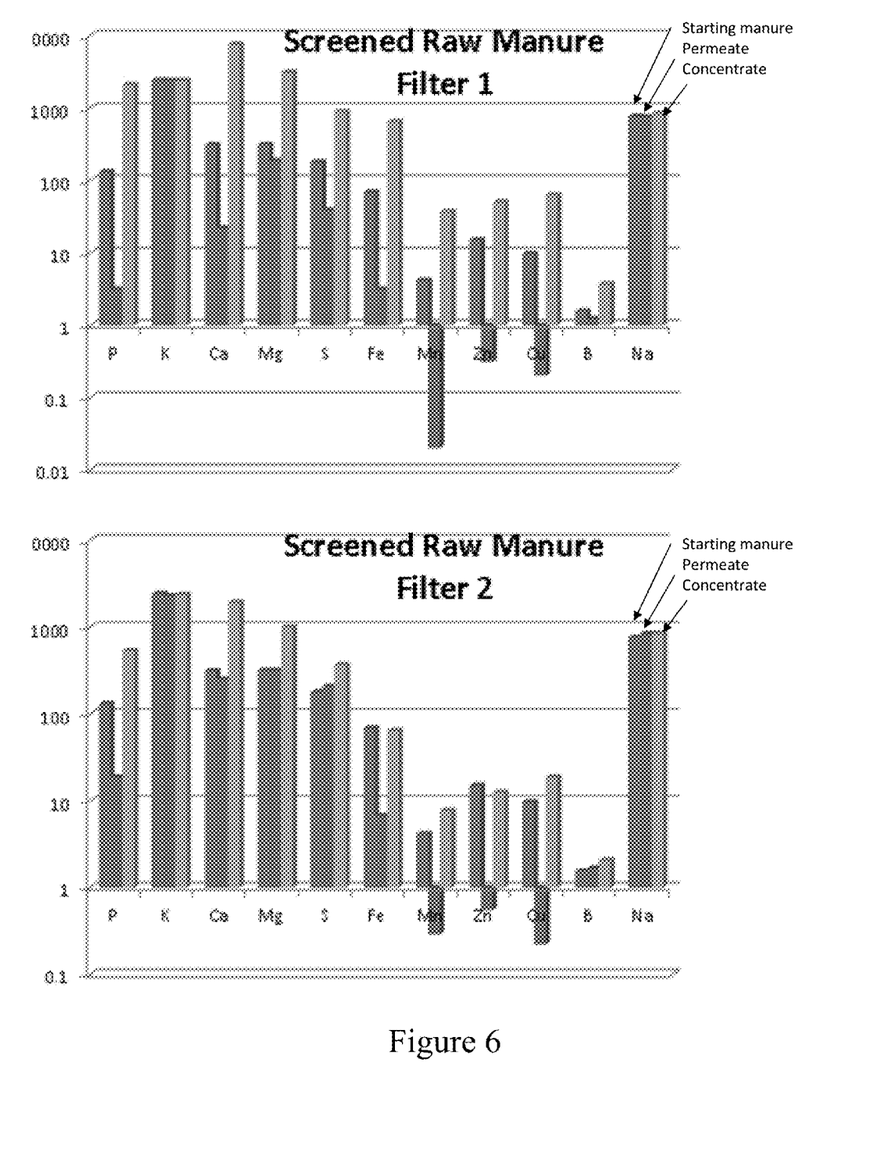
FIG. 6 shows the filtration difference when using two different filter screens in the cross-flow filtration cassette of the present invention.
Figure 7:
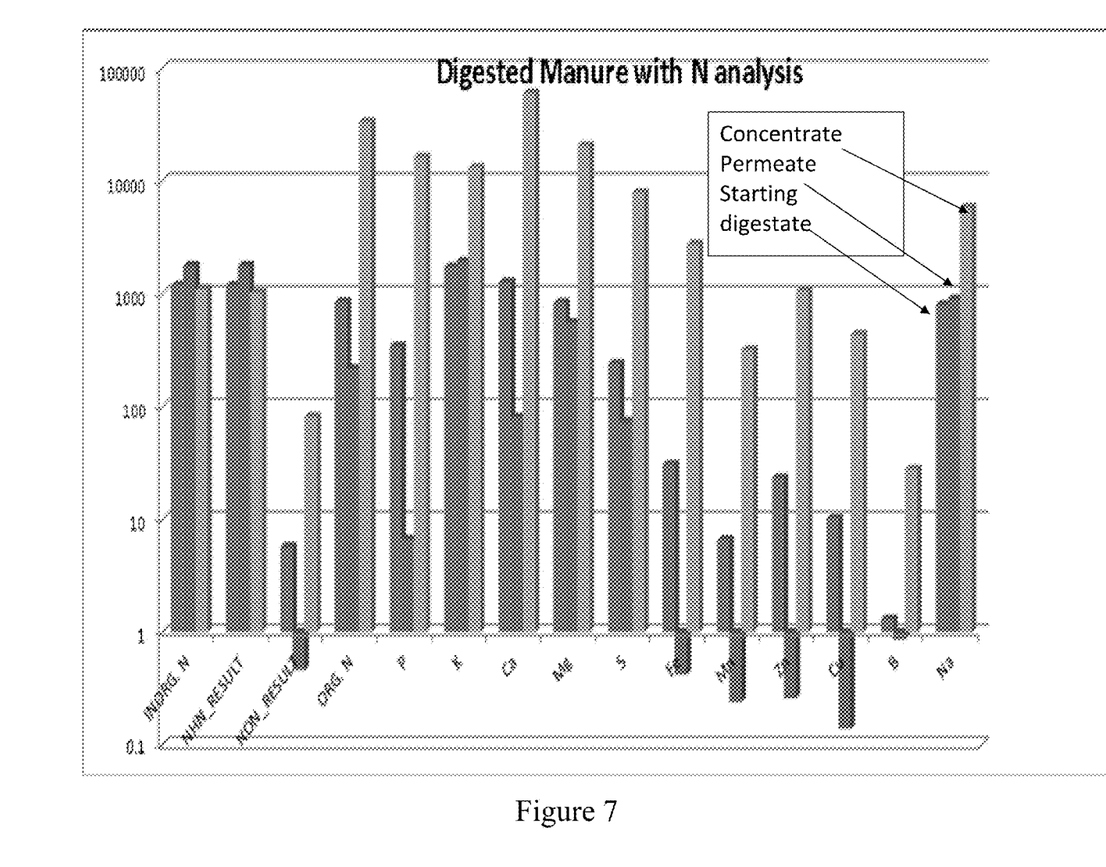
FIG. 7 shows that $NH_3/NH_4$ passes freely through the cross-flow filtration cassette of the present invention to provide a rich N fraction in the permeate.

FIGS. 5, 6, and 7 provide graphs showing the amount of specific elements separated from the manure, that being, the amount that is retained in the retentate concentration and that which has moved into the permeate using the cross-flow filtration cassette of the present invention. The figures show three columns wherein the first column (left side) includes the starting digestate or manure, the middle column includes the amount of a specific element in the permeate stream and the end column (left side) shows the amount of a specific element in the concentrated retentate stream.

FIG. 5 shows the difference in amounts of specific element of both a manure digestate and screen raw manure. Notably, the digestate provided increased amounts of the elements in the permeate streams, such as, phosphorus, magnesium, calcium and potassium. The concentrate in both tested manure types included essentially the same amount of phosphorus which was clearly increased relative to that in the permeate stream.

FIG. 6 shows the filtration difference when using two different filter screens in the cross-flow filtration cassette. Filter 1 is a highly hydrophilic 10 kD ultrafiltration membrane and Filter 2 is a polymeric type 10 kD ultrafiltration membrane. Reviewing the results, Filter 2 provides for increase amounts of phosphorus, calcium and magnesium in the permeate relative to Filter 1. In contrast, Filter 1 provides for a greater concentration in the concentrate (retentate) of phosphorus, calcium and magnesium. As such, depending on the desired product, the system, membrane size and type can be optimized to selectively isolate the desired product in specific separation cuts. Preferably the filter has a NMWL in the range of 5 kD to 30 kD.

FIG. 7 shows $NH_3/NH_4$ passes freely through the membrane. Therefore manure can be fractionated into P rich fractions (concentrate) and $NH_3/NH_4$ rich fractions (permeate) for differential application to fields.

FIG. 8 shows a preferred embodiment of a drying unit used in the processing of a viscous stream of manure. In a preferred embodiment, the viscous manure from the cross flow filtration system 24 is introduced into an optional mixing system 26 to ensure continuity of the material as it is cast, extruded, or wiped as a thin expanded and uniform layer 30 onto a moving conveyor belt 28. The conveyor belt may be constructed of any material such as polymeric, rubber or metal and can optionally be heated. Preferably the uniform thin layer is about 0.05 to about 0.01 inch in thickness and preferably when dried is reduced to about 0.001 to 0.005 inches. The chamber 32 provides air flow to evacuate the moisture and may optionally provide a heated belt, and/or a heating system for drying of the thin layer of the manure. In this system additional heating chambers may be added to ensure drying of the material. When the material is sufficiently dried it is moved into a container 34 for further transport to an end user.

Notably the drying unit described in FIG. 8 may also be applicable in producing high solids concentrations in the drying of components, such as starch, dairy proteins, algae, proteins, waste water solids, zeolite, and others. With a uniform thin film it may be possible to dry materials more consistently and without denaturing sensitive material such as protein-containing materials. When materials are inconsistent in concentration, size and shape the actual energy seen by the material must therefore also be inconsistent. Materials with maximum exposed surface area dry first but become overexposed to additional energy while the more dense materials are still drying. Thus proteins may be denatured while larger particles are are still in the process of drying. Thus the drying system of FIG. 8 provides for less heat input, lower energy cost, less denaturing of sensitive protein containing material, and decreased drying time. Further, attaching the drying system directly to the filtration system of the present invention provides for an integrated system that eliminates the high cost of specific equipment such as drum dryers or filter presses. Still further, the integrated system does not require the use of additives such as diatomaceous earth, polymers.

That which is claimed is:

1. A process for treating manure in order to produce a liquid fertilizer and a concentrated viscous fertilizer, the process comprising:
   providing a manure medium;
   separating the manure medium into the liquid fertilizer and the concentrated viscous fertilizer by passing the manure medium through at least one cross-flow filtration cassette comprising:
   an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the first filter sheet, the permeate sheet, and the second filter sheet in said array has at least one inlet basin opening at one end thereof and at least one outlet basin opening at an opposite end thereof, wherein each of the sheet members in the array has at least one permeate passage opening at longitudinal side margin portions of the sheet members, wherein each of the first and second retentate sheets have a multiplicity of channel openings extending longitudinally between the inlet and outlet basin openings of the first filter sheet, the permeate sheet, and the second filter sheet, and said retentate sheets are bonded to an adjacent filter sheet about peripheral end and side portions thereof, wherein the inlet basin openings, outlet basin openings, and permeate passage openings are in register with one another and the permeate passage openings of each of the retentate sheets are circumscribingly bonded to the adjacent filter sheet, with a central portion of each of the retentate sheets and adjacent filter sheets being unbonded to permit permeate contacting the retentate sheet to flow through the filter sheet to the permeate sheet, wherein the manure medium is flowed over the first and second filter sheets at a shear force that opposes accumulation of solids on the surface of the first and second filter sheets; and
   wherein the liquid fertilizer is in a permeate stream and the concentrated viscous fertilizer is in a retentate stream, wherein the retentate stream comprises about 10% to about 80% solids, and wherein the permeate stream is $NH_3/NH_4$ rich and the retentate stream is rich in phosphorus.

2. The process of claim 1, further comprising drying the concentrated viscous fertilizer to minimize water content thereby providing a solid fertilizer.

3. The process according of claim 1, wherein the manure medium comprises urine and fecal matter from dairy cattle, beef cattle, swine, sheep, goats, poultry, horses, rabbits or other confined animals.

4. The process according to claim 1, further comprising separating target products from either the liquid fertilizer or concentrated viscous fertilizer, wherein the target products are selected from nitrogen, potassium, or phosphorus.

5. The process of claim 3, wherein the manure medium further comprises wasted feed, bedding, spilled water, flush water, or wash water.

6. The process of claim 1, wherein the manure medium is about 80% to about 95% liquid by weight.

7. The process of claim 5, wherein the manure medium is pretreated before introduction into the at least one cross-flow filtration cassette, wherein the pretreating comprises treatment by a screw press, centrifuge, vibrating screen, mesh screening, belt filter, or hydrocyclone to remove unwanted large material.

8. The process of claim 1, wherein the manure medium is pretreated in an anaerobic digester.

9. The process of claim 1, wherein the liquid fertilizer is further treated with $MgCl_2$ to cause the precipitation of struvite ($MgNH_4PO_4.6H_2O$).

10. The process of claim 1, wherein the concentrated viscous fertilizer is further treated with ferric chloride ($FeCl_3$), ferric sulfate ($FeSO_4$), calcium hydroxide (lime), aluminum sulfate (alum) or aluminum chloride ($AlCl_3$) for phosphorus binding and the formation of common phosphorus salts.

11. The process according to claim 1, wherein the concentration of phosphorus in the permeate stream relative to the concentration of phosphorus in the retentate stream can be optimized by changing a material of the first and second filter sheets.

\* \* \* \* \*